July 13, 1965     M. B. HALL     3,194,904
LIMIT SWITCH ACTUATOR
Original Filed Nov. 29, 1960
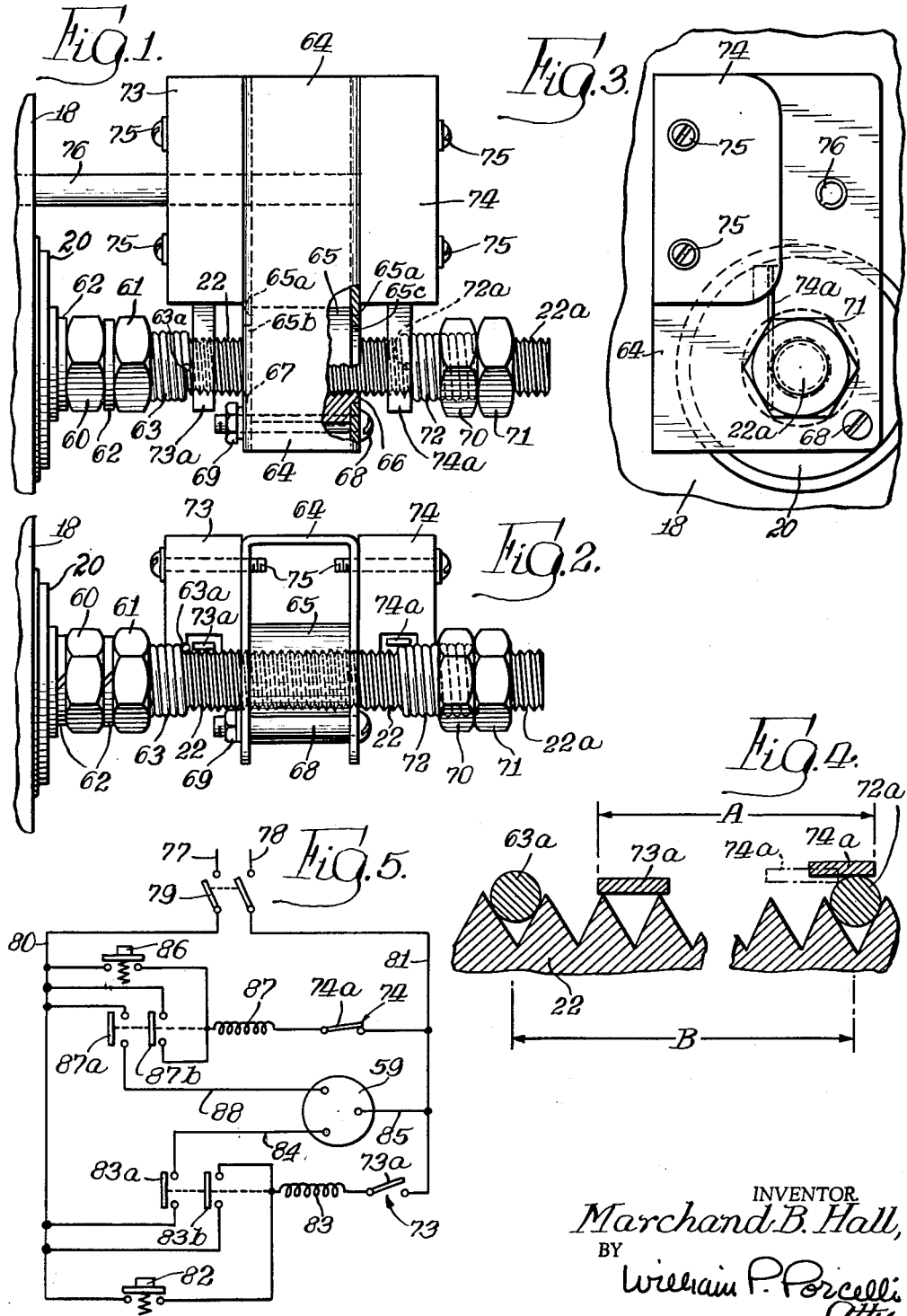
INVENTOR.
Marchand B. Hall,
BY William P. Porcelli
Atty.

United States Patent Office 3,194,904
Patented July 13, 1965

3,194,904
LIMIT SWITCH ACTUATOR
Marchand Blanchard Hall, Olympia Fields, Ill., assignor to Interlake Steel Corporation, a corporation of New York
Original application Nov. 29, 1960, Ser. No. 72,409, now Patent No. 3,052,178, dated Sept. 4, 1962. Divided and this application Aug. 31, 1962, Ser. No. 220,833
5 Claims. (Cl. 200—47)

This application is a division of my co-pending application Serial No. 72,409, filed November 29, 1960, now Letters Patent 3,052,178, issued September 4, 1962.

This invention relates to the art of motor control means and particularly to control means for the actuation of an electric motor in response to the rotation of a shaft rotated by said motor.

In my co-pending application there is shown a retractable binder strap guide which is extended and retracted by power means between a strap receiving position and a position clear of the strap path. The power means shown is an electric motor. The extreme extended and retracted positions of the strap guide are accurately determined by arresting the motor rotation as one or the other of the two electric switches are actuated. The electric switches are positioned with their actuating arms in the path of stops provided on a shaft driven by the motor in such a way that the stops cause actuation of the switches to control the motor actuation in response to the amount of rotation of the shaft.

Although applied in my co-pending application to control of a retractable binder strap guide which is powered by an electric motor, the invention of this application has a broader utility because it can be applied to any device having a rotatable shaft powered by an electric motor. It is, therefore, the principal object of this invention to provide a control means for controlling the rotation of a shaft driven by an electric motor wherein a threaded portion of the shaft is engaged with a threaded switch carrier so that rotation of the shaft by the electric motor causes the switch carrier to move longitudinally along the shaft between two spaced adjustable stops provided on the shaft, thus causing the arms of two switches mounted on the switch carrier to be alternately actuated by contact or separation from the two stops to control the actuation of the motor and thereby control rotation of the shaft.

It is believed that such a device can have wide application on length measuring devices wherein closer accuracy is required. For example, it is common to have devices which measure out predetermined lengths of strip material and cut them to length. The accuracy of such devices is often unsatisfactory. It is another object of this invention to provide a motor control device which is readily adaptable for application on a length measuring device whereby very accurate lengths can be measured and cut. It is necessary only to adapt the control means to a rotating shaft which can be, for example, a shaft for a feed wheel used to propel the strip material forward.

It is another object of the invention to provide such an improved device having easy adjustability so that the length of strip feed time or the rotation time of the control shaft can be varied expeditiously as necessary.

Other objects and advantages of the invention should become apparent upon reference to the accompanying drawings in which FIG. 1 shows a top plan view of the control means of the invention;

FIG. 2 shows a front elevation of the control means of the invention;

FIG. 3 shows a right end view of the control means as viewed in FIG. 1;

FIG. 4 shows an enlarged sectional view of certain portions of the control means for illustrative purposes; and FIG. 5 shows a simplified schematic wiring diagram of the electric control circuit used with the control means of FIGS. 1 to 4.

As shown in FIGS. 1, 2 and 3, a housing 18 is provided which is a journal housing for a shaft 22 connected to be driven by an electric motor 59. For purposes of this invention, the housing 18 could actually be the electric motor which drives the shaft 22 directly. As shown, the housing 18 is the journal housing for the shaft 22 and also can contain the motor 59 as well as any conventional speed changing drive between the motor 59 and the shaft 22.

The end of shaft 22 which passes through bearing 20 is threaded and projects quite far beyond the housing 18 in which the bearing 20 is mounted. This threaded end 22a of the shaft 22 is first provided with two threaded nuts 60 and 61 which can be locked together in a fixed position on the shaft 22 by means of two lock washers 62. The nut 61 is provided internally with the inner end of a helical spring 63 which is welded or soldered to it. The spring 63 acts as the threads of the nut 61 and engages the threads on the end 22a of the shaft 22. The nut 60 is internally threaded to directly engage the threads of the shaft end 22a. With the spring 63 securely bonded to the nut 61 as described, rotation of the nut 61 on the threads of the shaft end 22a causes rotation of the spring 63 with it. Beyond the free end 63a of the spring 63 is mounted an inverted U-shaped bracket 64 by means of an internally threaded circular nut 65. The circular nut 65 has an enlarged center portion having annular end walls 65a guided against the inside walls of the bracket 64 and it also has reduced diameter ends 65b and 65c which project into round openings 66 and 67 in the side walls of the bracket 64. Through apertures in the side walls of the bracket 64 is also mounted a screw 68 which is held in place by means of a nut 69 at its end. The effect of tightening of the nut 69 on the screw 68 is to draw the two side walls of the bracket 64 together and thereby clamp the circular nut 65 fixed relative to the bracket 64. When rotation of the circular nut 65 is required for adjustment, the nut 65 is loosened so that the pressure of the side plates of the bracket 64 is relieved against the ends of the circular nut 65, at which time the circular nut is free to be rotated relative to the bracket 64. During this rotational movement, it is urged one way or another on the shaft 22 because of its threaded engagement with it. The purpose of this adjustment of the circular nut 65 is hereinafter described.

Adjacent to the extreme end of the shaft end 22a are two more nuts 70 and 71. The nut 71 is similar to 69 and is internally threaded to directly engage the threads of the shaft 22 and it is a locking nut for nut 70. The nut 70 is similar to nut 61 and is provided with a helical spring 72 which is soldered or welded to it in the same manner. The spring 72 acts as the internal thread for the nut 70 on the threads of the shaft 22. Rotation of the nut 70 causes rotation of the spring 72 and causes the spring to move one way or the other longitudinally on the shaft, depending upon which direction the nut is rotated.

On the outer surfaces of the side walls of the bracket 64 are mounted two switches 73 and 74. These switches have actuating arms 73a and 74a which extend transversely over the shaft 22. These switches 73 and 74 are secured by means of screws 75 to the side walls of the bracket 64. The bracket 64 is provided with a pin 76 which has its inner end secured to the housing 18 while its outer end is secured through the side walls of the bracket 64. This pin maintains the bracket 64 in a fixed angular relationship to the shaft 22.

With the switch actuating arms 73a and 74a positioned laterally across the shaft 22 in the path of the springs 63 and 72, as the bracket 64 is moved along the shaft 22 in one direction or another, the arms 73a and 74a are actuated alternately by contact with the ends 63a and 72a of the two springs.

In actual operation, the switches are used to arrest the operation of the driving motor 59 in either direction of rotation of the shaft 22. In FIG. 1, it may be assumed that the positions of the switch arms 73a and 74a are as they would be initially. In this case the arm 74a is pivoted upwardly onto the spring end 72a. In this position of the arm 74a, the contacts of switch 74 are open. At this same time, the arm 73a is off of the spring end 63a and resting upon the threads of the shaft 22. In this position of the arm 73a, the contacts of the switch 73 are closed. When it is desired to rotate the shaft 22, another switch in series with switch 73 is closed and this energizes the motor 59 to cause rotation of the shaft 22 in one direction. As the shaft 22 is rotated in a first direction, its threaded engagement with the circular nut 65 causes the bracket 64 to be moved toward the left as viewed in FIG. 1. Movement of the bracket 64 to the left causes the switches 73 and 74 to likewise be moved to the left relative to the shaft 22 so that the switch arm 74a falls off of the end 72a of the spring and onto the threaded portions of the shaft 22 to close the contacts of the switch 74. Shortly thereafter, when the bracket 64 has moved far enough, the switch arm 73a contacts the end 63a of the spring 63 to cause the arm 73a to be raised to open the contacts of the switch 73. Closing of the contacts of switch 74 prepares the circuit for later initiating reverse rotation of the shaft 22, while opening of the contacts of switch 73 breaks the circuit with the electric motor 59 and thereby arrests its operation to arrest the rotation of the shaft 22. In this manner, by having the springs 63 and 72 properly spaced, it is possible to accurately determine the number of revolutions made before rotation of the shaft 22 stops.

The fit of the pin 76 through the walls of the bracket 64 is loose enough that the bracket 64 is free to move over it as the shaft 22 is rotated to cause such movement.

FIG. 4 indicates schematically the reason for the adjustment of the circular nut 65 relative to the bracket 64. If the initial angular position of where the start of the internal thread of the circular nut is not proper, it is possible that the switch arm 74a will possibly first contact the end 72a of the spring 72 at a position indicated by phantom lines in that view. In that position it is possible that insufficient movement of the switch arm 74a will not have occurred to completely actuate the switch. If this is true, the nut 69 is loosened and the circular nut 65 is adjusted until arm 74a is upon the spring end 72a as shown in solid outline in FIG. 4.

By referring to FIG. 5, the entire electrical operation of the controls involving switches 73 and 74 can be described. In FIG. 5, a suitable supply voltage is applied between wires 77 and 78. Upon closing of a master switch 79 connected to these wires 77 and 78, the voltage is carried between conductors 80 and 81. At this time, none of the electrical components are energized. However, switch 73 is closed because its switch arm 73a is off of the end 63a of the spring 63 and switch 74 is open because its arm 74a is on the spring end 72a. In order to cause the shaft 22 to be rotated in said first direction by the motor 59, the switch 82 is closed manually. This applies voltage from conductors 80 and 81 across a relay solenoid 83 by way of closed switch 73. This energizes solenoid 83 to cause the solenoid contact switches 83a and 83b to be closed. Closing of contact switch 83b maintains solenoid 83 energized after the switch 82 is spring returned after release by the operator. Contact switch 83a energizes the electric motor 59 through conductors 84 and 85 so that the motor 59 rotates in said first direction. As rotation of the shaft 22 continues, the bracket 64 is moved to the left, as viewed in FIG. 1. The movement of the bracket 64 correspondingly moves the switches 73 and 74 to the left with it. At a predetermined time, determined by the spacing between the spring ends 63a and 72a, the switch arm 73a rides up on to the spring end 63a to cause switch 73 to be opened. During the initial movement of the bracket 64, however, switch 74a is closed as the spring arm 74a falls off of the spring end 72a. Opening of switch 73 de-energizes relay solenoid 83 to allow the spring return of its contact switches 83a and 83b to open. Opening of switch contact 83b sets up the circuit for the next cycle of operation while opening of switch contact 83a de-energizes the motor 59 and arrests its motion and likewise the rotation of shaft 22.

When it is desired to reverse rotation of the shaft 22, a switch 86 is closed manually to energize a relay solenoid 87 through the closed switch 74. Energization of the solenoid 87 causes its switch contacts 87a and 87b to be closed. 87b is a holding contact for solenoid 87 to maintain it energized after the actuating button for the switch 86 is spring returned upon manual release. Closing of switch contact 87a energizes the motor 59 through conductors 88 and 85. Since the motor 59 is a reversing type motor wherein its direction of rotation is determined by whether it is energized through conductors 84 or 88, energizing this motor 59 through the conductor 88 causes it to be rotated in a direction to cause reverse rotation of the shaft 22. When the shaft 22 rotates sufficiently, the bracket 64 will have moved sufficiently to the right that the switch arm 73a will have moved off of the spring end 63a to close switch 73 and the switch arm 74a will have moved onto the spring end 72a so that the switch 74 is again opened. The parts are then all in the positions as shown in FIGS. 1 and 2 in readiness for the cycle to be repeated.

Although only a single embodiment of the invention has been shown and described, it should be understood that the invention can be made in many different ways without departing from the true scope of the invention, as defined by the appended claims.

I claim:

1. A switch mechanism comprising, a rotatable threaded shaft, a threaded switch carrier threadedly engaged with a threaded portion of said shaft so that upon rotation of the shaft the switch carrier is moved longitudinally along said shaft, said switch carrier supporting two switches, stop means on the shaft on opposite sides of the switch carrier, said switches having actuating arms in the path of said stop means so that as the switch carrier is moved longitudinally of the shaft the two actuating arms are moved to actuate the switches as they either contact or separate from the stop means.

2. A switch means as defined by claim 1 characterized by, said stop means being spiral springs of the same pitch as the threaded portion of the shaft and threadedly engaged with said shaft to be adjustable for movement along the shaft to vary the space interval between the stops and therefore the operating interval of the two switches.

3. A control means for controlling the rotation of a shaft according to claim 1 characterized by, said stop means being spiral springs of the same pitch as the threaded portion of the shaft and threadedly engaged with said shaft to be adjustable for movement along the shaft to vary the space interval between the stops and therefore the operating interval of the two switches, the threaded portion of said threaded switch carrier being rotatable on the shaft relative to the switch carrier in order to move the switch carrier longitudinally of the shaft to insure proper engagement of the switch actuating arms with said stop means.

4. A switch mechanism comprising, a rotatable threaded shaft, a motor driving said shaft to cause it to rotate, a threaded switch carrier threadedly engaged with a threaded portion of said shaft so that upon rotation of the shaft the switch carrier is moved longitudinally along said shaft.

5. A control mechanism comprising, a rotatable threaded shaft, a threaded carrier threadedly engaged with a threaded portion of said shaft so that upon rotation of the shaft the carrier is moved longitudinally along said shaft, said carrier supporting two control devices, stop means on the shaft on opposite sides of the carrier, said control devices each having actuating means in the path of said stop means so that as the carrier is moved longitudinally of the shaft the actuating means are moved to actuate the control devices as the actuating means either contact or separate from the stop means.

References Cited by the Examiner
UNITED STATES PATENTS

| | | | |
|---|---|---|---|
| 2,253,557 | 8/41 | Collins | 200—47 |
| 2,566,824 | 9/51 | Carlson | 200—47 |
| 2,600,568 | 6/52 | Nelson | 318—468 X |
| 2,951,920 | 9/60 | Miller | 200—47 |

ROBERT K. SCHAEFER, *Acting Primary Examiner.*

ORIS L. RADER, *Examiner.*